Dec. 27, 1949     T. LAWRENCE     2,492,586
CLAMP
Filed Dec. 3, 1946
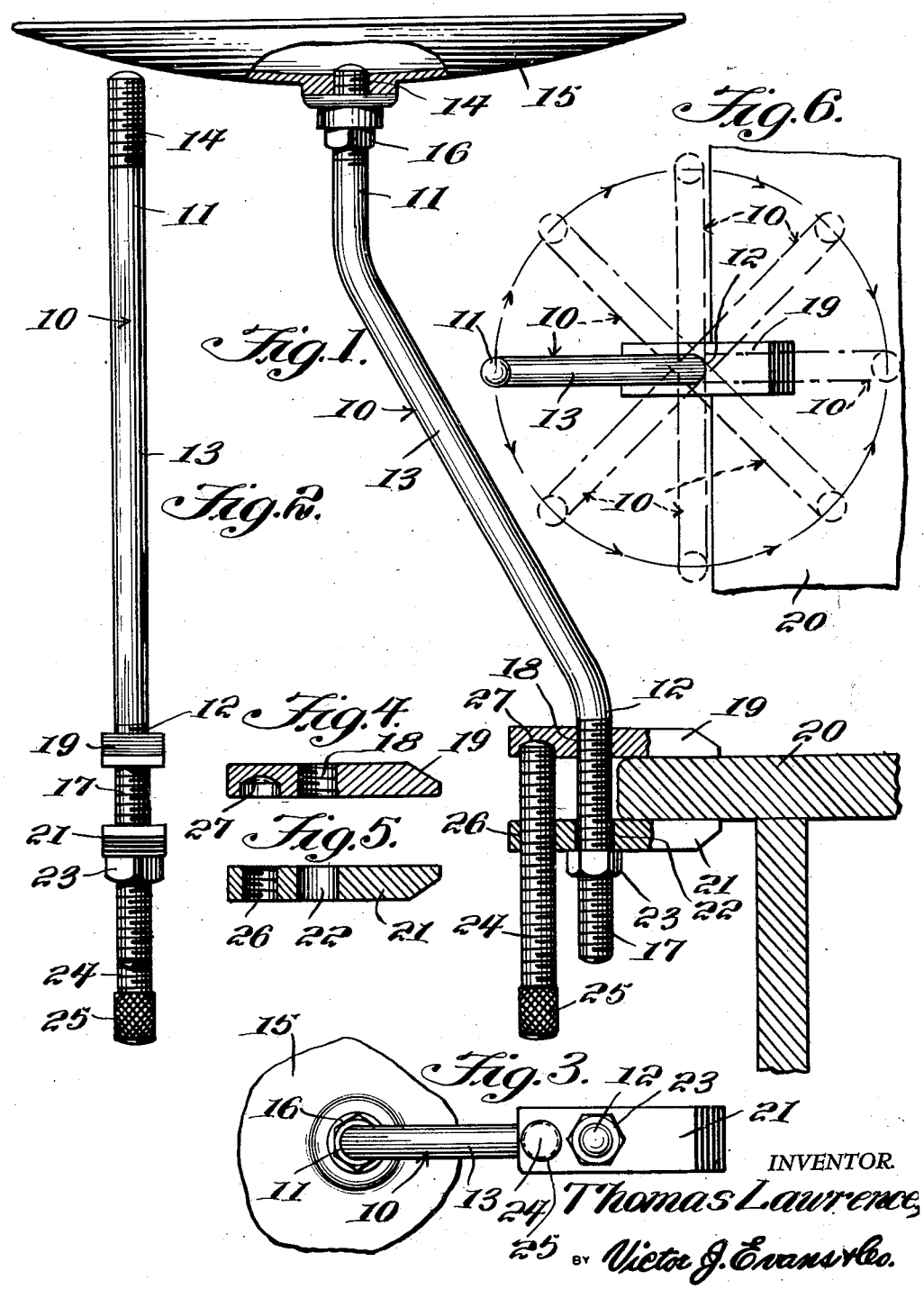
INVENTOR.
Thomas Lawrence,
BY Victor J. Evans & Co.
ATTORNEYS Patented Dec. 27, 1949

2,492,586

UNITED STATES PATENT OFFICE 2,492,586

CLAMP

Thomas Lawrence, Mobile, Ala.

Application December 3, 1946, Serial No. 713,621

1 Claim. (Cl. 248—226)

This invention relates to a clamp which is adapted to be used with a support for peanut vending machines.

In the past, all types of clamps in use with supports for peanut vending machines have had a tendency to break or become useless through wear, and accordingly, therefore, it is an object of this invention to provide a clamp that is durable, simple in construction and operation, and will outlast the types of clamps in use in the past.

With the above and other objects and advantages in view, the invention consists of the novel details of construction, arrangement and combination of parts more fully hereinafter described, claimed and illustrated in the accompanying drawing in which:

Figure 1 is an elevational view partly in section of an embodiment of the invention;

Figure 2 is an edge view thereof;

Figure 3 is a bottom plan view thereof;

Figure 4 is a sectional view of the top clamping member;

Figure 5 is a sectional view of the bottom clamping member and

Figure 6 is a top plan view in reduced scale, showing the various positions in which the support can be placed.

Referring more in detail to the drawing, the reference numeral 10 designates a rod-like supporting arm having an upper straight portion 11 and a lower straight portion 12, which are joined by an inclined portion 13. The portion 11 is threaded at 14 to receive the cup-shaped supporting disc 15, and a nut 16, when tightened, will lock the disc thereon. The portion 12 is threaded at 17 to receive the threaded bore 18 of the upper clamping member 19, which is then positioned on the upper surface of a suitable support 20.

The lower clamping member 21 is then loosely mounted on the portion 12 by means of the smooth bore 22, which in this position is in alinement with the bore 18 of the member 19. A nut 23 is then threaded onto the threaded portion 17 of the portion 12 until the member 21 engages the undersurface of the support 20. To firmly clamp the members 19 and 21 on the support 20, a screw 24, having a knurled end 25, is threaded into the threaded bore 26 of the member 21, and moved upwardly until it engages the seat 27 in the member 19, whereupon further upward movement will expand the rear ends of the members 19 and 21 to firmly retain the members on the support 20.

Before the nut 23 is firmly threaded onto the portion 12, the arm may be positioned in any of the positions shown in Figure 6.

There has thus been provided a clamping means for a support which is simple in construction and operation, and it is believed that the structure and operation thereof will be apparent to those skilled in the art.

It is also to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A device of the character described, comprising a supporting arm having threaded lower and upper ends, upper and lower straight portions, and an inclined portion joining said upper and lower portions to form a unit structure an upper clamp member having a threaded bore for threadably mounting said upper clamp member on the lower end of said arm, a lower clamp member with a smooth bore for loosely mounting said lower clamp member on said arm, means threadably mounted on said arm below said lower clamp member to force said clamp members together, a threaded bore in the lower clamp member spaced from the smooth base therein, a seat in the upper clamp member spaced from the threaded bore therein, and means threadably mounted in the threaded bore in said lower clamp member and loosely received in the seat in said upper clamp member to expand the rear ends of said clamp members to firmly retain said clamp members on a support.

THOMAS LAWRENCE.

REFERENCES CITED

The following references are of record in the file of this patent:

UNITED STATES PATENTS

| Number | Name | Date |
|---|---|---|
| 1,128,046 | Reyman | Feb. 9, 1915 |
| 2,232,448 | Gross | Feb. 18, 1941 |